US009962766B2

(12) United States Patent
Savings et al.

(10) Patent No.: US 9,962,766 B2
(45) Date of Patent: May 8, 2018

(54) METHOD AND APPARATUS FOR MAKING AN OBJECT

(71) Applicant: ROLLS-ROYCE PLC, London (GB)

(72) Inventors: David Savings, Nottingham (GB); David Wimpenny, Leicestershire (GB)

(73) Assignee: ROLLS-ROYCE plc, London (GB)

( * ) Notice: Subject to any disclaimer, the term of this patent is extended or adjusted under 35 U.S.C. 154(b) by 642 days.

(21) Appl. No.: 14/408,837

(22) PCT Filed: Mar. 13, 2013

(86) PCT No.: PCT/EP2013/055145
§ 371 (c)(1),
(2) Date: Dec. 17, 2014

(87) PCT Pub. No.: WO2013/189617
PCT Pub. Date: Dec. 27, 2013

(65) Prior Publication Data
US 2015/0202686 A1 Jul. 23, 2015

(30) Foreign Application Priority Data
Jun. 18, 2012 (GB) .................................. 1210738.9

(51) Int. Cl.
*B22F 3/00* (2006.01)
*B29C 67/00* (2017.01)
(Continued)

(52) U.S. Cl.
CPC ............ *B22F 3/008* (2013.01); *B29C 64/153* (2017.08); *B29C 64/20* (2017.08); *B29C 64/386* (2017.08); *B22F 2003/1057* (2013.01); *B29K 2105/251* (2013.01); *B33Y 10/00* (2014.12); *B33Y 30/00* (2014.12); *B33Y 50/02* (2014.12)

(58) Field of Classification Search
CPC ............ B22F 3/008; B22F 2003/1057; B29C 64/386; B29C 64/20; B29C 64/153; B29K 2105/251; B33Y 30/00; B33Y 50/02; B33Y 10/00
See application file for complete search history.

(56) References Cited

U.S. PATENT DOCUMENTS 5,640,667 A   6/1997 Freitag
5,658,412 A   8/1997 Retallick et al.
(Continued)

FOREIGN PATENT DOCUMENTS

DE         197 57 463 A1    9/1998
DE    10 2009 020 987 A1    11/2010
(Continued)

OTHER PUBLICATIONS

International Search Report issued in PCT/EP2013/055145 dated Jul. 15, 2013.
(Continued)

*Primary Examiner* — Nahida Sultana
(74) *Attorney, Agent, or Firm* — Oliff PLC

(57) ABSTRACT

A method and apparatus for making an object comprising repeatedly selectively depositing a material by controlling one or more deposition areas using a deposition control plate comprising one or more apertures and selectively melting the selectively deposited material.

13 Claims, 9 Drawing Sheets

(51) Int. Cl.
  *B29C 64/153* (2017.01)
  *B29C 64/20* (2017.01)
  *B29C 64/386* (2017.01)
  *B33Y 10/00* (2015.01)
  *B33Y 30/00* (2015.01)
  *B33Y 50/02* (2015.01)
  *B22F 3/105* (2006.01)
  *B29K 105/00* (2006.01)

(56) References Cited

U.S. PATENT DOCUMENTS

| | | | | |
|---|---|---|---|---|
| 5,833,914 | A * | 11/1998 | Kawaguchi | B29C 67/06 156/257 |
| 6,682,688 | B1 | 1/2004 | Higashi et al. | |
| 8,070,474 | B2 * | 12/2011 | Abe | B29C 64/153 118/256 |
| 8,282,377 | B2 * | 10/2012 | Higashi | B29C 67/0077 264/113 |
| 8,550,802 | B2 * | 10/2013 | Fuwa | B22F 3/1055 264/497 |
| 2002/0145213 | A1 * | 10/2002 | Liu | G03G 15/224 264/40.1 |
| 2005/0015171 | A1 | 1/2005 | Cruz-Uribe et al. | |
| 2006/0115052 | A1 * | 6/2006 | Hoheisel | G21K 1/025 378/154 |
| 2007/0026099 | A1 | 2/2007 | Hagiwara | |
| 2011/0252618 | A1 | 10/2011 | Diekmann et al. | |
| 2011/0293771 | A1 | 12/2011 | Oberhofer et al. | |
| 2013/0241095 | A1 * | 9/2013 | Korten | A61C 13/0018 264/16 |
| 2015/0183166 | A1 * | 7/2015 | Yoo | B29C 67/0081 264/128 |
| 2015/0224575 | A1 * | 8/2015 | Hirata | B28B 7/465 524/503 |
| 2016/0185045 | A1 * | 6/2016 | Linnell | B29C 67/0088 264/401 |
| 2017/0232674 | A1 * | 8/2017 | Mark | B29C 67/0081 264/308 |
| 2018/0056608 | A1 * | 3/2018 | Dunn | B29C 67/0092 |

FOREIGN PATENT DOCUMENTS

| | | |
|---|---|---|
| DE | 20 2010 005 162 U1 | 12/2010 |
| WO | WO 96/29192 | 9/1996 |
| WO | WO 2011/082152 A1 | 7/2011 |
| WO | WO2012078533 A1 * | 6/2012 ............ B33Y 30/00 |

OTHER PUBLICATIONS

Written Opinion of the International Searching Authority issued in PCT/EP2013/055145 dated Jul. 15, 2013.
United Kingdom Search Report issued in GB1210738.9 dated Oct. 5, 2012.
United Kingdom Search Report issued in GB1210738.9 dated Feb. 5, 2013.

* cited by examiner

METHOD AND APPARATUS FOR MAKING AN OBJECT

This invention claims the benefit of UK Patent Application No, GB1210738.9, filed on 18 Jun. 2012, which is hereby incorporated herein in its entirety.

FIELD OF THE INVENTION

Embodiments of the present invention relate to a method and apparatus for making an object. In particular, some relate to a method and apparatus for making a gas turbine component using additive layer manufacturing.

BACKGROUND TO THE INVENTION

Additive layer manufacturing is a process used to manufacture objects layer by layer. A layer of material is deposited and selectively melted to fuse the material into a layer of the object. This process is repeated to form the object in layers.

Additive layer manufacturing is expensive and time consuming.

BRIEF DESCRIPTION OF VARIOUS EMBODIMENTS OF THE INVENTION

According to various, but not necessarily all, embodiments of the invention there is provided a method of making an object comprising repeatedly: selectively depositing a material by controlling one or more deposition areas using a deposition control plate comprising one or more apertures; and selectively melting the selectively deposited material.

According to various, but not necessarily all, embodiments of the invention there is provided an apparatus for making an object comprising: means for supporting a deposition control plate, wherein one or more apertures in the deposition control plate restrict deposition of material to one or more deposition areas; and means for selectively melting material deposited within the one or more deposition areas.

According to various, but not necessarily all, embodiments of the invention there is provided an apparatus for making an object comprising: supports configured to support a deposition control plate, wherein one or more apertures in the deposition control plate restrict deposition to one or more deposition areas; and an energy source configured to selectively melt material deposited within the one or more deposition areas.

Embodiments of the invention provide the significant advantage that the volume of material used is reduced using the deposition control plate.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
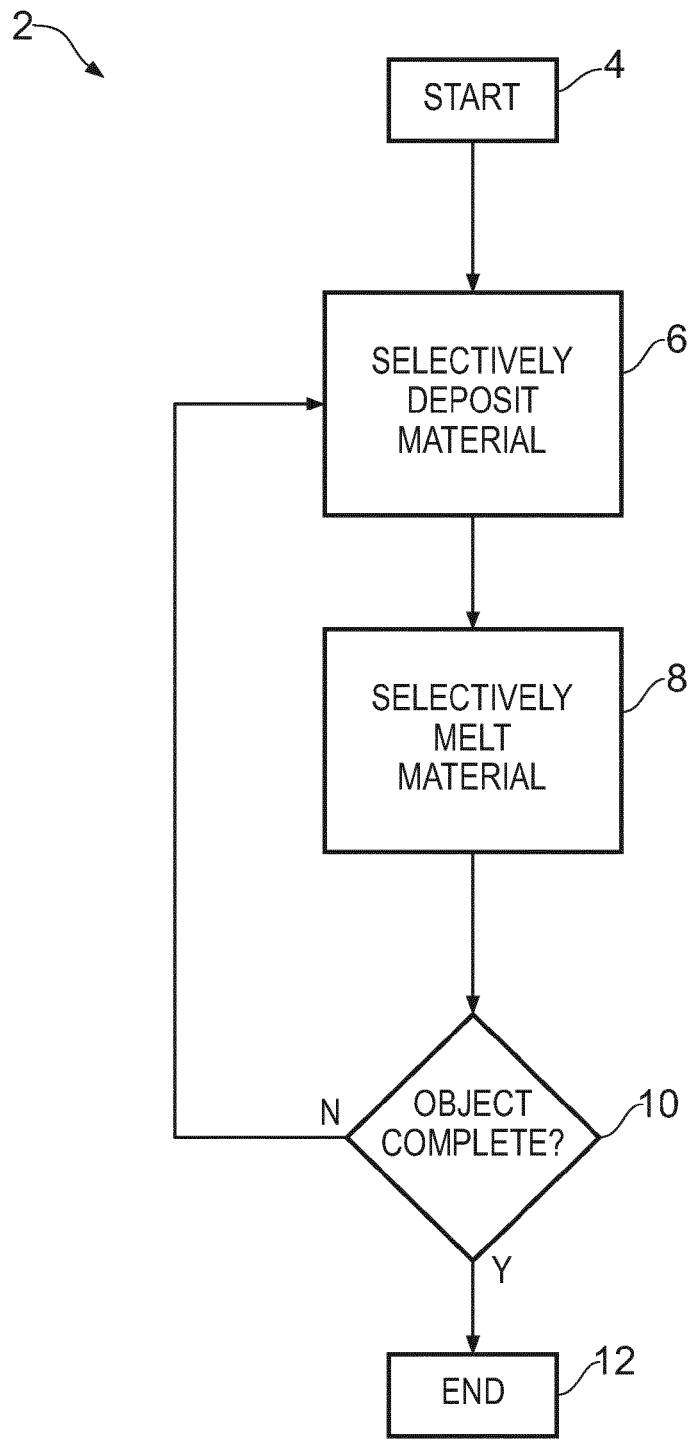
FIG. 1 illustrates an example of a method for making an object.

The Figures illustrate a method 2 of making an object 36 comprising repeatedly: selectively depositing 6 a material 28 by controlling one or more deposition areas using a deposition control plate 22 comprising one or more apertures 24; and selectively melting 8 the selectively deposited material 28.

The figures and following description illustrate an object 36 being made in three layers. The description is limited to three layers for illustrative purposes. It will be readily understood by one skilled in the art that the object 36 may comprise fewer layers or more layers. For example the object 36 may comprise a single layer or the object 36 may comprise several hundred or more layers. It will be further understood by the person skilled in the art that the three layers illustrated in the figures and discussed below may be formed as part of an object 36 comprising many layers and may be the first three layers of the object 36, the final three layers of the object 36 or three intermediary layers of the object 36.

Figure 2A:
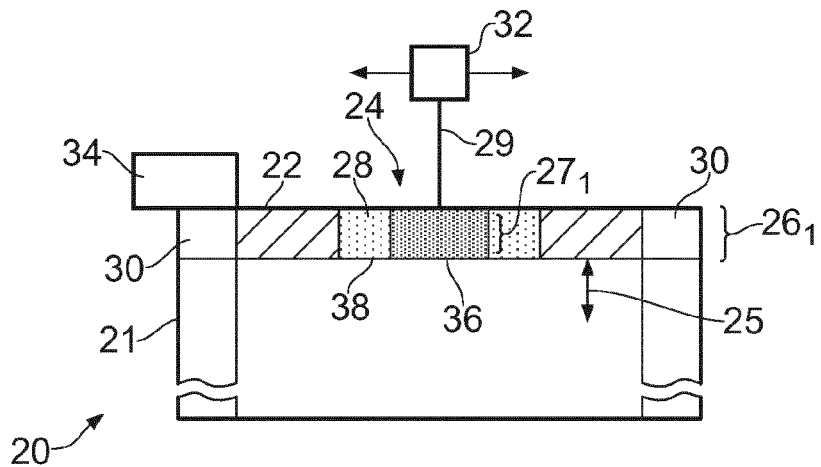
FIGS. 2A, 2B, 2C and 2D illustrate an example of an apparatus for making an object.
Figure 2B:
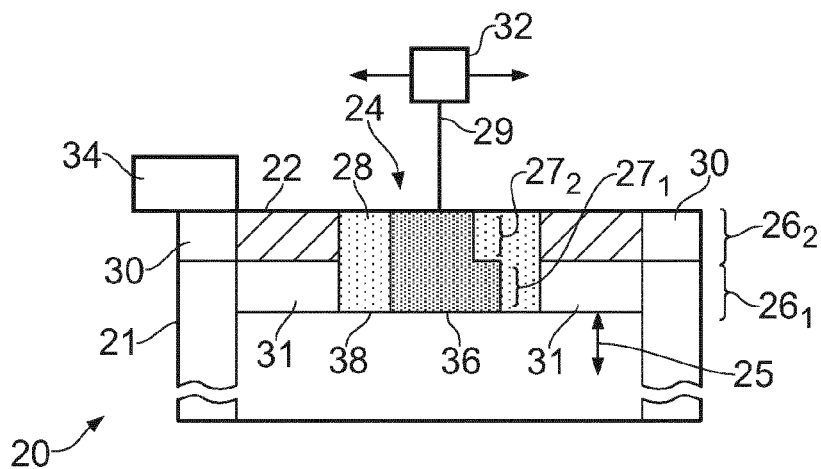
Figure 2C:
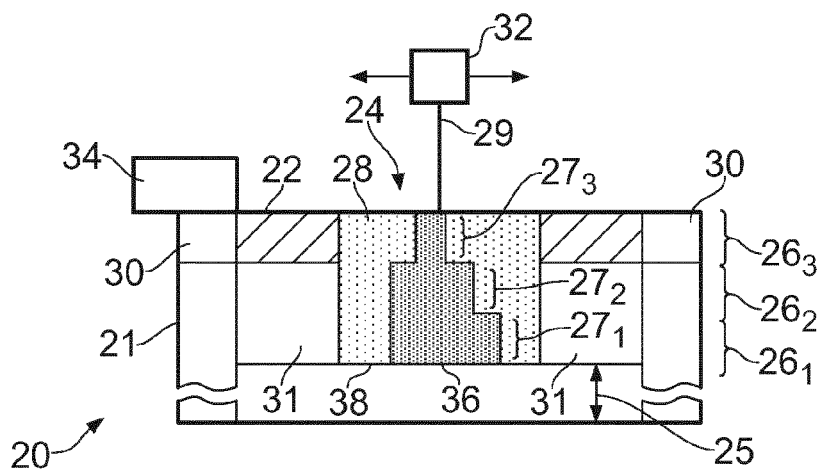

FIG. 1 illustrates an example of a method 2 of making an object 36. The method 2 may, for example, be employed in techniques such as additive layer manufacturing. One example implementation of the method 2 is illustrated in FIGS. 2A, 2B and 2C which illustrate manufacture of an object 36 from layers 26 of material 28.

The method 2 of FIG. 1 starts at block 4. Next, at block 6 a material 28 is selectively deposited as a layer of material 26.

The material 28 may be processed to form an object 36. The material 28 may be converted from an unprocessed form to a processed form, layer by layer. The processed layers collectively form the object 36.

The material 28 may for example be a solid or a liquid. The material 28 may be a solid comprising particles of regular or irregular size and shape. The material 28 may be for example a powder. The material 28 may comprise a metal, plastic or other material.

From block 6, the method 2 moves to block 8. At block 8, the selectively deposited material 28 is selectively melted. As illustrated in FIGS. 2A, 2B and 2C, selectively melted material 28 solidifies and fuses to form a layer 27 of the object 36.

Next, at block 10 of FIG. 1, it is determined if the object 36 is complete. From block 10 the method 2 branches. If the object 36 is complete the method 2 passes to block 12 and ends. If the object 36 is not complete, the method 2 returns to block 6.

On returning to block 6, additional material 28 is selectively deposited and selectively melted to form, as illustrated in FIGS. 2A 2B and 2C another layer 27 of the object 36. The selective melting also acts to fuse a current layer 27 of the object 36 with the previous layer 27 of the object 36.

The method 2 shown in FIG. 1 comprises both selective deposition and selective melting thus reducing the quantity of supporting powder around the object being constructed.

An example of the method 2 will now be described in greater detail with reference to FIGS. 2A to 2C. FIGS. 2A, 2B and 2C illustrate a system 20 and an apparatus 21 for making an object 36. The system 20 comprises an apparatus 21 and a deposition control plate 22. The deposition control plate 22 comprises an aperture 24, which restricts deposition of material 28 to a deposition area.

The apparatus 21 may comprise a platform 38. The platform 38 is able to move in a first direction, indicated by the arrow 25 and a second direction, opposite to the first direction. The platform 38 defines a plane orthogonal to the first direction.

The apparatus 21 may further comprise supports 30 for supporting a deposition control plate 22 over the platform 38, a deposition system 34 configured to deposit the material 28 and an energy source 32 for selectively melting deposited material 28. In this example, the energy source 32 is configured such that an output 29 from the energy source 32 may be directed at any point over the platform 38.

The energy source 32 may be, for example, a laser or an electron beam source. The energy source 32 may be configured to heat the apparatus 21 in addition to melting the material 28.

FIG. 2A illustrates an example of the formation of a first layer $27_1$ of an object 36 according to the method 2. Material 28 is selectively deposited onto the platform 38, in the aperture 24 of the deposition control plate 22, to form a first layer $26_1$. The material 28 is selectively deposited such that the top of the selectively deposited material 28 is level with the top of the deposition control plate 22. The material 28 is then selectively melted to form a first layer $27_1$ of the object 36.

The selective melting is performed by tracing the output 29 of the energy source 32 over the parts of the material 28 within the aperture 24 that are to be selectively melted. The output 29 of the energy source 32 is traced in a pattern that defines the first layer $27_1$ of the object 36. The tracing defines a perimeter, inside which the material 28 is melted.

Material 28 melts when it is exposed to the output 29 of the energy source 32 for a first period of time. The material 28 fully melts and fuses. Therefore, the tracing must be performed at a speed to allow melting of the material 28. This may be achieved, for example, by holding the output 29 of the energy source 32 at a point for the first period of time, and then moving the output 29 of the energy source 32 to a next point to be melted.

When the first layer $27_1$ is complete, the platform 38 is moved down and a second layer $27_2$ is formed as shown in FIG. 2B. In some examples, no material 28 is melted in the first layer $26_1$ of an object 36 and the platform 38 is moved down immediately after the selective deposition.

Material 28 is selectively deposited onto the first layer $26_1$, in the aperture 24 of the deposition control plate 22 to form a second layer $26_2$. The material 28 is selectively deposited such that the top of the selectively deposited material 28 is level with the top of the deposition control plate 22. The material 28 is then selectively melted to form a second layer $27_2$ of the object 36. The selective melting also fuses the second layer $27_2$ to the first layer $27_1$.

The selective melting is performed by tracing the output 29 of the energy source 32 over the parts of the material 28 within the aperture 24 that are to be selectively melted. The output 29 of the energy source 32 is traced in a pattern that defines the second layer $27_2$ of the object 36. The tracing defines a perimeter, inside which the material 28 is melted.

When the second layer $27_2$ is complete, the platform 38 is moved down and a third layer $27_3$ is formed as shown in FIG. 2C.

Material 28 is selectively deposited onto the second layer $26_2$, in the aperture 24 of the deposition control plate 22 to form a third layer $26_3$. The material 28 is selectively deposited such that the top of the selectively deposited material 28 is level with the top of the deposition control plate 22. The material 28 is then selectively melted to form a third layer $27_3$ of the object 36. The selective melting also fuses the third layer $27_3$ to the second layer $27_2$.

The selective melting is performed by tracing the output 29 of the energy source 32 over the parts of the material 28 within the aperture 24 that are to be selectively melted. The output 29 of the energy source 32 is traced in a pattern that defines the third layer $27_3$ of the object 36. The tracing defines a perimeter, inside which the material 28 is melted.

In this example, when the third layer $27_3$ is complete the object 36 is then complete.

The distance that the platform 38 is moved down following the completion of a layer 26 defines the thickness of the subsequent layer 26. In the example described above and with reference to FIGS. 2A, 2B and 2C and in further examples described below and in reference to FIGS. 2D, 3A, 3B and 3C and 6A, 6B, 6C and 6D the platform 38 is moved down so that the top of the previously formed layer 26 is level with the bottom of the deposition control plate 22, i.e. the layers 26 have the same thickness as the deposition control plate 22.

In other examples, the thickness of the layers 26 may be less than the thickness of the deposition control plate 22. The layers 26 may be between 20 microns and 200 microns thick. In some examples, different layers 26 may be of different thickness.

Figure 2D:
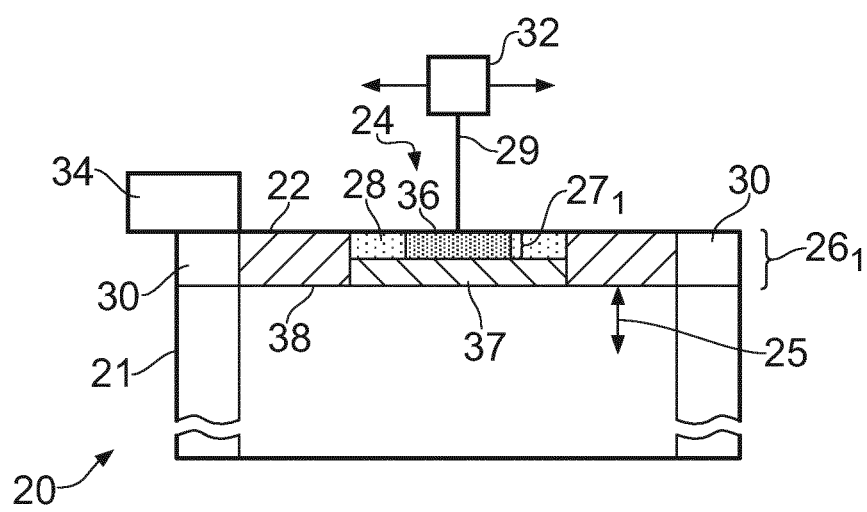

FIG. 2D illustrates an alternative example of forming a first layer $26_1$. A deposition control plate insert 37 is placed in the aperture 22 before the object 36 is started. The platform 38 may then be moved down to define the correct thickness for the first layer $26_1$. Alternatively, the thickness of the deposition control plate insert 37 may be such that the platform 38 does not need to be moved to define the correct thickness for the first layer $26_1$. The control plate insert 37 descends with the platform 38 for each layer 26 of the object 36 being formed.

Material 28 to form the first layer $26_1$ is selectively deposited on a deposition control plate insert 37 instead of the platform 38. The material 28 is selectively deposited such that the top of the selectively deposited material 28 is level with the top of the deposition control plate 22. The material 28 is then selectively melted to form a first layer $27_1$ of the object 36. Subsequent layers 26 are formed as described previously.

In the example illustrated in FIG. 2D, the deposition control plate insert 37 enables the first layer $26_1$ to be thinner than the deposition control plate 22.

In making the object 36, a void 31 is formed underneath the deposition control plate 22. The sides of the void 31 are formed by the apparatus 21 and the material 28. The material 28 must be retained in some way so that it does not fall into the void 31.

In one example, the method 2 may comprise partially melting at least some of the selectively deposited material 28 prior to the selective melting 8 of the objected 36 being formed.

Material 28 is partially melted when it is exposed to the output 29 of the energy source 32 for a second period of time, shorter than the first period, to loosely fuse the material 28. In another example, material 28 is partially melted by using a lower energy output 29 of the energy source 32. The partially melted material 28 is thus self-supporting. The partial melting is performed by tracing the output 29 of the energy source 32 over the parts of the material 28 that are to be partially melted.

Figure 3A:
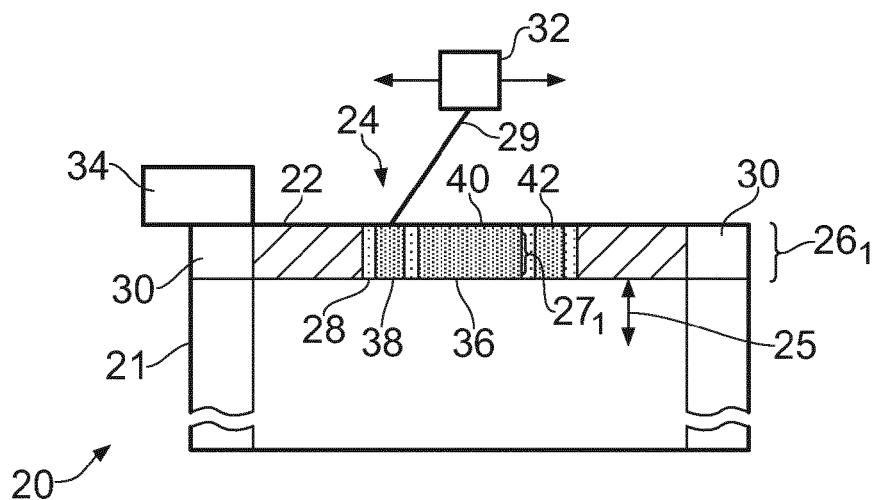
FIGS. 3A, 3B and 3C illustrate an example of making an object along with a retainer.
Figure 3B:
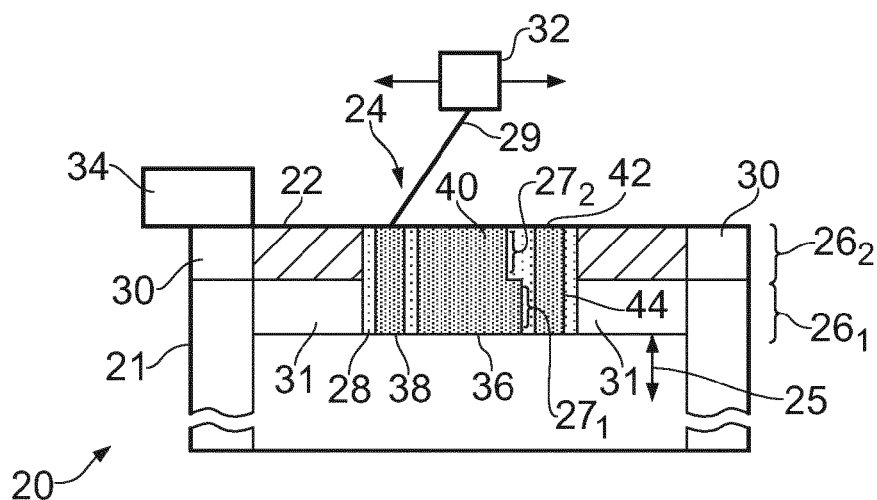
Figure 3C:
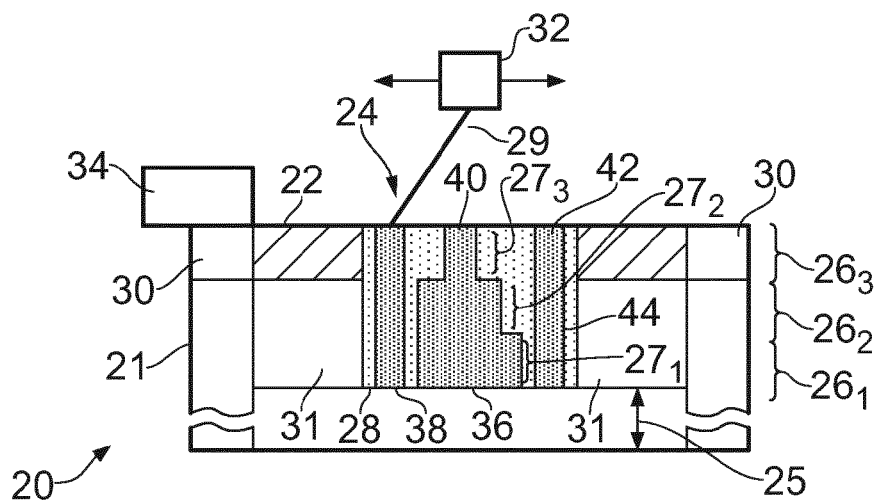

FIGS. 3A to 3C illustrates an example where a retainer 44 is formed to retain the material 28 during the process of making an object 36.

FIG. 3A illustrates an example of the formation of a first layer $27_1$ of an object 36. The method initially progresses as described above. A first part 40 of the material 28 is melted to form the first layer $27_1$ of the object 36. A second part 42 of the material 28 is melted to form the first layer of the retainer 44. The second part 42 of the material 28 surrounds the layer $27_1$ of the object 36, forming a retaining enclosure.

After the first layer $27_1$ of the object 36 and the first layer of the retainer 44 are formed, the platform 38 is moved down and a second layer $26_2$ is formed as shown in FIG. 3B. The first layer of the retainer 44 retains the material 28 in the first layer $26_1$ and prevents it falling into the void 31 when the platform 38 is moved.

Material 28 is selectively deposited in the aperture 24. The material 28 is selectively deposited such that the top of the selectively deposited material 28 is level with the top of the deposition control plate 22. A first part 40 of the material 28 is melted to form the second layer $27_2$ of the object 36. A second part 42 of the material 28 is melted to form the second layer of the retainer 44. The second part 42 of the material 28 surrounds the layer $27_2$ of the object 36 and overlies the first layer of the retainer 44. The selective melting fuses the first layer $27_1$ of the object 36 to the second layer $27_2$ of the object 36 and the first layer of the retainer 44 to the second layer of the retainer 44.

The second part 42 of the material 28 may be separate from the deposition control plate 22 and the layers 27 of the object 36.

After the second layer $27_2$ of the object 36 and the second layer of the retainer 44 are formed, the platform 38 is moved down and a third layer $26_3$ is formed as shown in FIG. 3C. The second layer of the retainer 44 retains the material 28 in the second layer $26_2$ and prevents it falling into the void 31 when the platform 38 is moved.

Material 28 is selectively deposited in the aperture 24. The material 28 is selectively deposited such that the top of the selectively deposited material 28 is level with the top of the deposition control plate 22. A first part 40 of the material 28 is melted to form the third layer $27_3$ of the object 36. Then a second part 42 of the material 28 is melted to form the third layer of the retainer 44. The second part 42 of the material 28 surrounds the third layer $27_3$ of the object 36 and overlies the first and second layer of the retainer 44. The selective melting fuses the second layer $27_2$ of the object 36 to the third layer $27_3$ of the object 36 and the second layer of the retainer 44 to the third layer of the retainer 44.

In this example, when the third layer $27_3$ is complete the object 36 and the retainer 44 are complete.

Figure 4:
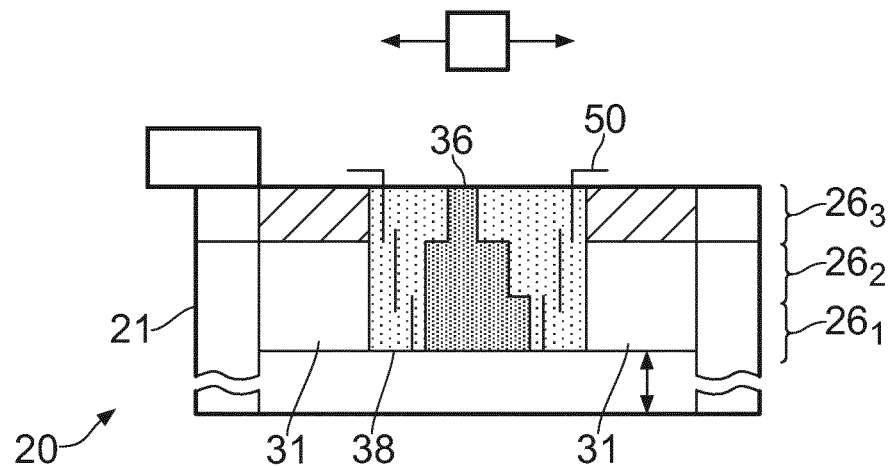
FIG. 4 illustrates an example of an object comprised in a telescopic retainer.

FIG. 4 illustrates a further example of how the material 28 may be retained so that it does not fall into the void 31. The system 20 may further comprise a preformed telescopic retainer 50.

The telescopic retainer 50 may be configured so that the lower layers of the retainer 50 fit inside the upper layers of the retainer. Therefore, when making the first layer $27_1$ of an object 36, the telescopic retainer 50 will be fully compressed and have a height matching the height of the first layer $26_1$.

When the platform 38 moves in order to make the second layer $27_2$ of the object 36, the telescopic retainer 50 is partially extended, so that the height of the telescopic retainer 50 is increased to match the height of the first two layers. Similarly when the platform 38 moves to make the third layer $27_3$ of the object 36, the telescopic retainer 50 is again expanded to match the height of the three layers. In this way, the telescopic retainer 50 acts to prevent material 28 falling into the void 31.

In some examples, the method 2 may require the apparatus 21 to be environmentally controlled or sealed from the external atmosphere. This can be achieved by making a sealed apparatus and keeping it under vacuum or by flooding the apparatus with an inert gas.

Figure 5:
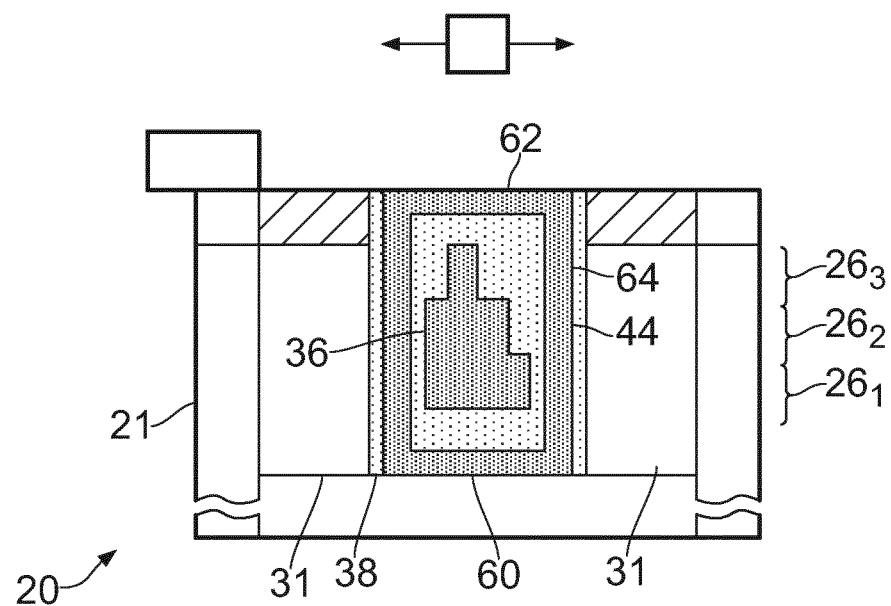
FIG. 5 illustrates an example of an object comprised in a container.

In some examples, it may also be necessary to keep the object 36 in a environmentally controlled container 64 after the object 36 has been completed. FIG. 5 shows an example of a completed object 36 in an environmentally controlled chamber 64. Before the object 36 is made, a base 60 is provided. The object 36 and a retainer 44 is then made layer by layer. Once the object 36 is completed, a cap 62 is provided. The base 60, layers of the retainer 44 and the cap 62 combine to form the container 64.

The deposition control plate 22 should be configured to withstand any heating required in the method 2 and should be configured to support the load of material 28 deposited. The deposition control plate 22 should also be formed from a material that is inert with respect to the method 2. The deposition control plate 22 may require out-gassing before the method is carried out.

The deposition control plate 22 may be made from, for example, 316 stainless steel or the same material as the object 36. The deposition control plate 22 may be, for example, a preformed deposition control 22 plate provided before the process has started.

In some examples, the aperture 24 of the deposition control plate 22 is fixed throughout the process. In these examples, the aperture 24 should be configured to have larger dimensions than the largest dimensions of the object 36 in any of the layers 27.

Alternatively, in other examples, the aperture 24 of the deposition control plate 22 may be varied throughout the process. FIGS. 6A to 6D illustrate an example of a method of forming an object 36 where the aperture 24 is varied during the process.

Figure 6A:
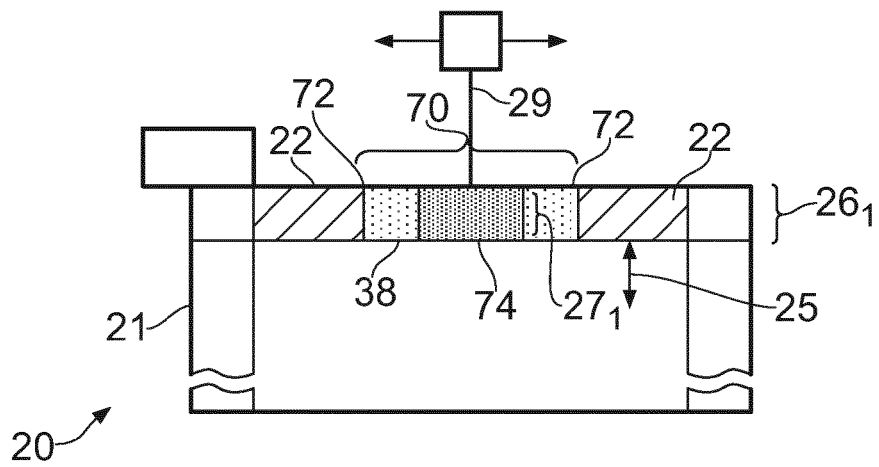
FIGS. 6A, 6B, 6C and 6D illustrate an example of making an object and varying the aperture size of a deposition control plate.

FIG. 6A illustrates the formation of the first layer $27_1$ of the object 36. A deposition control plate 22 is provided with a first aperture 70 defined by a first perimeter 72. Material 28 is selectively deposited in the first aperture 70. The material 28 is selectively deposited such that the top of the selectively deposited material 28 is level with the top of the deposition control plate 22. An interior part 74 of the material 28 is selectively melted to form the first layer $27_1$ of the object 36.

Figure 6B:
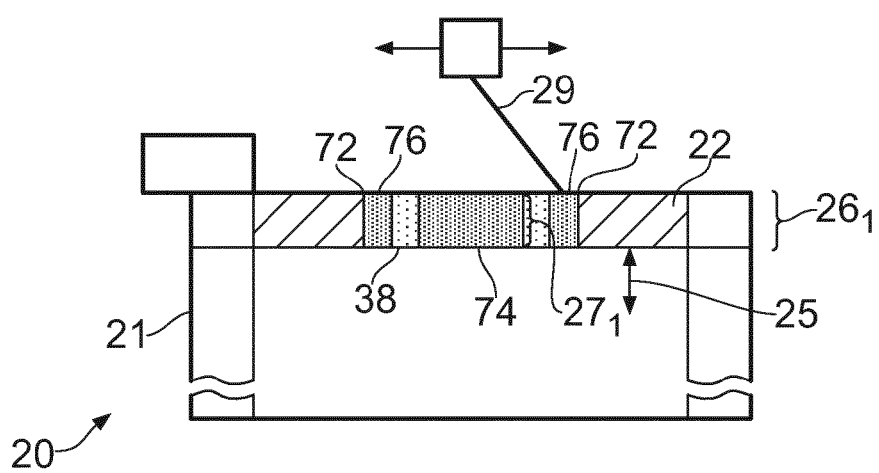

Following the formation of the first layer $27_1$ of the object 36, a second aperture 80, defined by a second perimeter 82 is formed by selectively melting material adjacent to the first aperture 76. The second aperture 80 is used for forming the second layer $27_2$ of the object 36 as shown in FIG. 6B. The selective melting fuses the material adjacent to the aperture 76 to form the deposition control plate 22. This process forms a new deposition control plate 22 comprising the second aperture 80. The new deposition control plate 22 is formed by augmenting the original deposition control plate 22 with the selectively melted material adjacent to the first aperture 76.

Figure 6C:
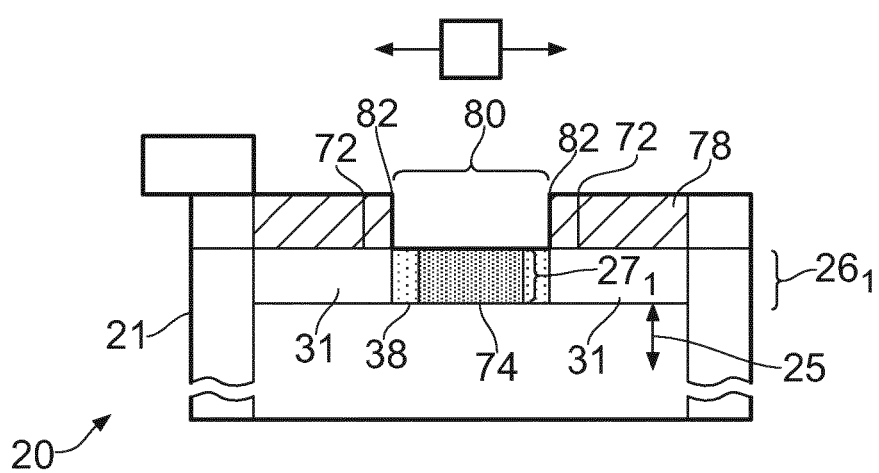

The platform 38 is then moved down to form the second layer 27₂. As shown in FIG. 6C, the material 28 that was not melted and the material 28 forming the first layer 27₁ of the object 36 also move down with the platform 38. However, the melting process has fused the material 28 adjacent to the aperture 76 to the deposition control plate 22. Therefore a new deposition control plate 78 comprising a second aperture 80 is formed.

Figure 6D:
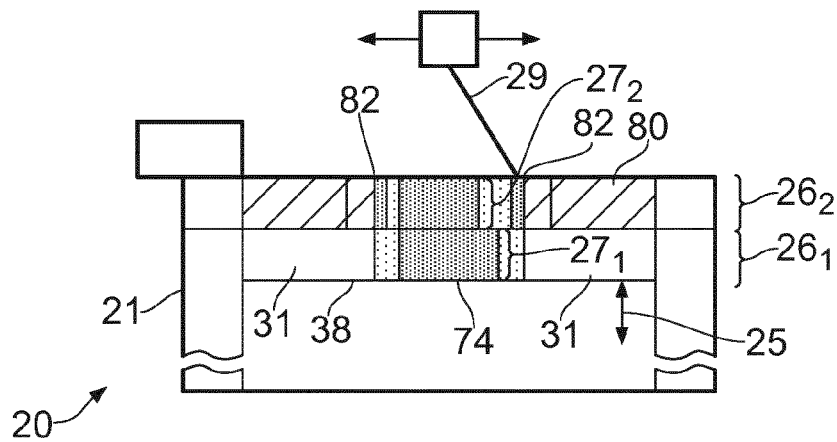

FIG. 6D shows the formation of a second layer 27₂ of the object 36. Material 28 is selectively deposited in the second aperture 80. The material 28 is selectively deposited such that the top of the selectively deposited material 28 is level with the top of the deposition control plate 22. An interior part 74 of the material 28 is selectively melted to form the second layer 27₂ of the object 36. A further aperture for forming the third layer 27₃ may be formed by selective melting material 28 adjacent to the second aperture 80.

In some examples, the deposition control plate 22 is not provided as a preformed deposition control plate 22 but is formed in the apparatus 21 before the object 36 is made.

Figure 7A:
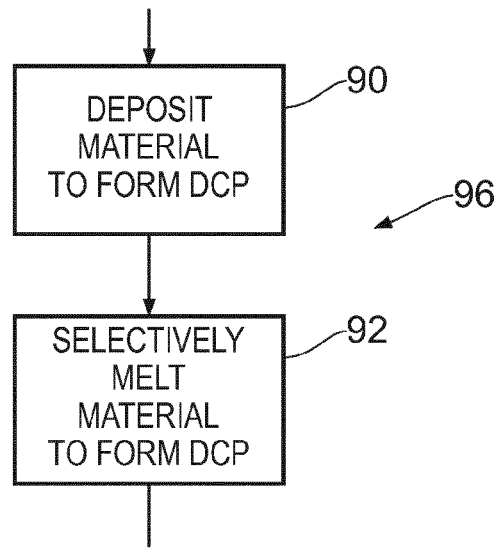
FIGS. 7A and 7B illustrate an example of optional steps for a method for making an object.

FIG. 7A shows an example of a method 96 for forming a deposition control plate 22. The method 96 may be placed between blocks 4 and 6 of the method 2 illustrated in FIG. 1. The method 96 starts at block 90 where material 28 is deposited over the platform 38.

The method 96 then proceeds to block 92. The material 28 deposited over the platform 38 is selectively melted to form a deposition control plate 22 comprising at least one aperture 24.

When the deposition control plate 22 is formed, the platform 38 is moved down. The deposition control plate 22 is supported above the platform 38 so does not move down. However the material 28 in the aperture 24, which is not selectively melted, moves down with the platform 38. The first layer 27₁ of the object 36 may then be formed.

Figure 7B:
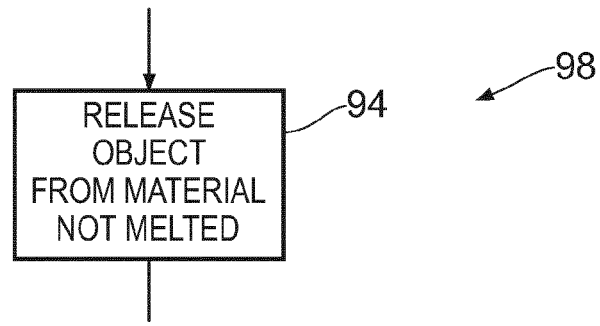

FIG. 7B illustrates an example of a method 98 than can be placed between blocks 10 and 12 of method 2 illustrated in FIG. 1. The method 98 comprises block 94. The object 36 is removed from the material 28 not melted to leave the object 36.

In some examples, releasing the material 28 may require physical or chemical processes to remove the material 28. For example, where the material 28 not melted has been partially melted, the material 28 may be removed by, for example, sand blasting.

Alternatively, removing the object 36 from the material 28 not melted may involve removing the material 28 from a retainer 44,50 such as described in reference to FIGS. 3A to 3C, 4 and 5.

The apparatus 21 comprises supports 30 configured to support the deposition control plate 22 over the platform 38. The supports 30 may be, for example retractable pins 106 or at least one recess 110 configured to interact with the deposition control plate 22.

Figure 8A:
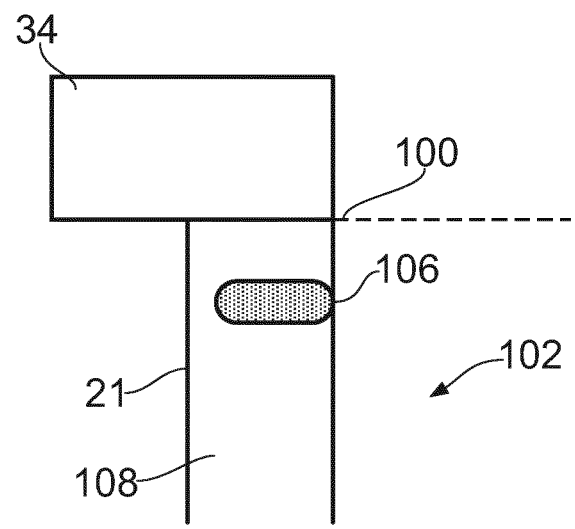
FIGS. 8A and 8B illustrate an example of an apparatus comprising retractable pins.
Figure 8B:
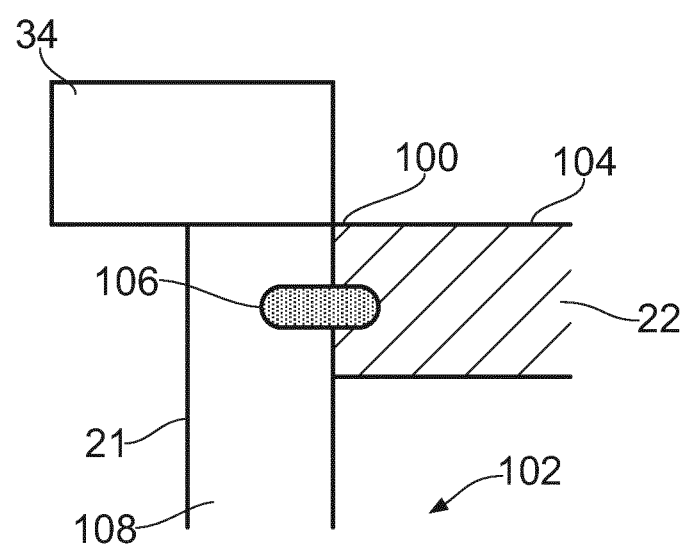

FIGS. 8A and 8B illustrate an example of an apparatus 21 comprising retractable pins 106 configured to support the deposition control plate 22.

FIG. 8A illustrates the apparatus 21 without the deposition control plate 22. The sidewalls 108 of the apparatus 21 define a volume 102 in which the object 36 is formed. When the deposition control plate 22 is not in place, the retractable pin 106 is housed outside the volume 102. For example, the pins 106 may be entirely housed in the side wall 108.

FIG. 8B illustrates an example of the apparatus 21 when the deposition control plate 22 is in place. The retractable pin is now extending into the deposition control plate 22 which is in the volume 102. The retractable pin 106 therefore supports the deposition control plate 22 within the volume 102.

The deposition control plate 22 may be configured to receive the pins 106 of the apparatus 21. For example, the deposition control plate 22 may comprise channels configured to align with the pins 106.

If the deposition control plate 22 is formed as part of the method 2, as discussed above with reference to FIG. 7A, the pins 106 should be extended into the volume 102 before the deposition or selective melting of the material 28. In this way the deposition control plate 22 is formed around the pins 106.

In some examples the apparatus 21 may comprise two retractable pins 106. In other examples, the apparatus 21 may comprise more retractable pins 106.

FIGS. 9A to 9D illustrate an example of an apparatus 21 comprising recesses 110 configured to support the deposition control plate 22.

Figure 9B:
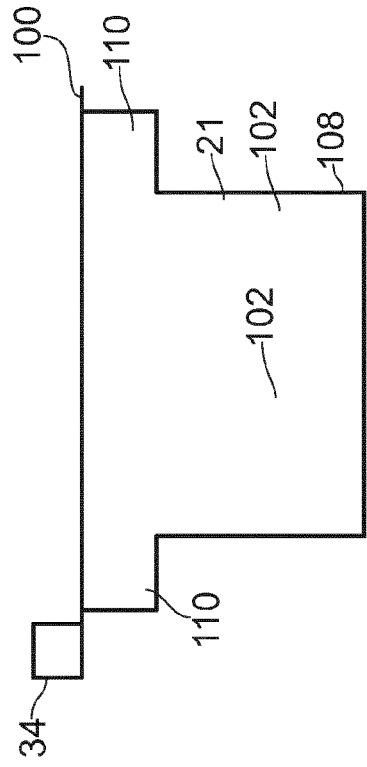
FIGS. 9A, 9B, 9C and 9D illustrate an example of an apparatus comprising recesses.
Figure 9A:
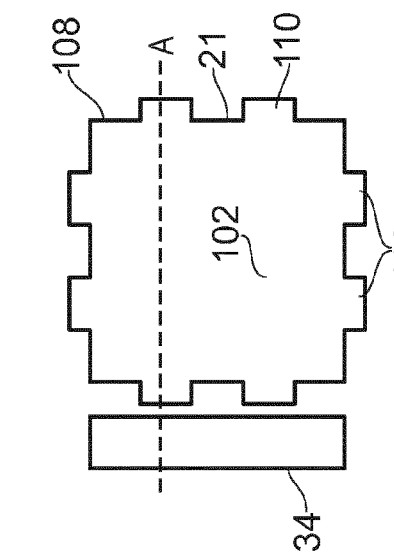

FIGS. 9A and 9B illustrate an example of the apparatus 21 when the deposition control plate 22 is not place. FIG. 9A illustrates a plan view of the apparatus 21. Recesses 110 are formed in the side walls 108 by forming protrusions from the side walls 108, which act to make the apparatus 21 wider at certain points. FIG. 9B shows a side view of the apparatus 21 taken through A. FIG. 9B illustrates that the protrusions have a depth which defines the extent of the recess 110.

Figure 9D:
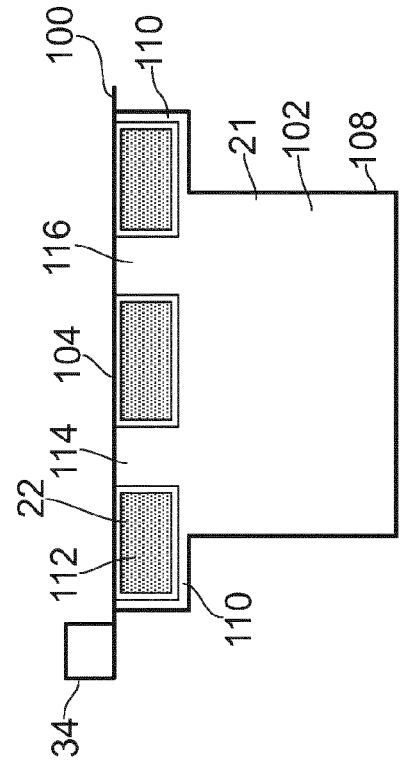
Figure 9C:
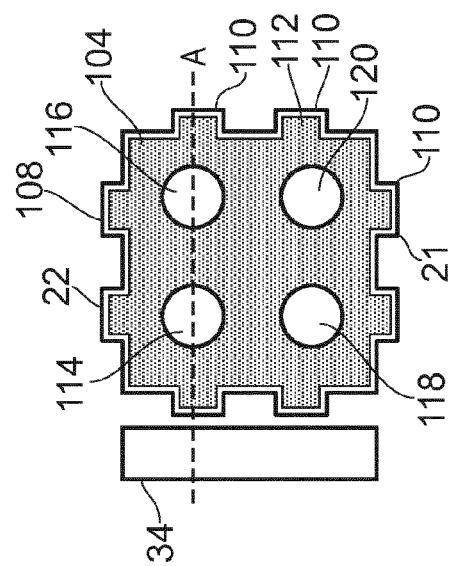

FIGS. 9C and 9D illustrate an example of the apparatus 21 when the deposition control plate 22 is in place. The deposition control plate 22 is configured to have protrusions 112 aligned with the recesses 110. The protrusions 112 rest on the base of the recess 110 and act to support the deposition control plate 22.

The apparatus 21 may comprise one recess 110. For example, the apparatus 21 may comprise one continuous recess 110 around the perimeter of the volume 102. Alternatively, the apparatus 21 may, for example, comprise a number of recesses 110 arranged around the perimeter of the volume 102.

In some examples, the recesses 110, may be configured so that when the deposition control plate 22 is formed as part of the method 2, as discussed above with reference to FIG. 7A, material 28 is deposited in the recess 110 in step 90. The energy source 32 may also be configured to be able to selectively melt the material 28 deposited in the recess 110 to form protrusions that support the deposition control plate 22.

The deposition control plate 22 acts to reduce the effective volume 102 of the apparatus 21 by reducing the total area on which material 28 must be deposited.

FIGS. 8A and 8B and 9A to D show an example of a deposition control plate 22 supported over the platform 38. The apparatus 21 may comprise a deposition system 34 configured to deposit the material 28.

The deposition system 34 may, for example, comprise a hopper, configured to dispense material 28 and a spreading system configured to spread the material 28. The deposition system 34 is configured such that the top of the material 28 is spread so as to be level with a plane 100.

The supports 30 of the apparatus 21 are configured to support the deposition control plate 22 over the platform 38 so that the top 104 of the deposition control plate 22 is level with the plane 100.

In some examples, the deposition of material 28 by the deposition system 34 can be varied depending on the deposition control plate 22. The size of the aperture 24 can be different depending on the size of object 36 to be made. In some examples, the deposition control plate 22 may comprise more than one aperture 24 to allow a number of objects 36 to be made simultaneously.

In one example, the deposition of material 28 is varied depending on the location, number and size of apertures 114, 116, 118, 120. For example, the amount of material 28 deposited may be varied depending on the volume of material 28 required.

For example, referring to FIG. 9C, if a deposition control plate 22 comprises four apertures 114, 116, 118 and 120 and objects 36 are to be made in the four apertures 114, 116, 118, 120, a first amount of material 28 will be deposited and spread over the entire deposition control plate 22.

Referring again to FIG. 9C, if the deposition control plate 22 comprises only a single aperture 114 and an object 36 is to be made in this aperture 114, a second amount of material 28, less than the first amount, will be deposited. The deposited material 28 will then be spread over the entire area of the deposition control plate 22.

If, for example, the deposition control plate 22 comprises two apertures 114 and 116, then a third amount of material 28, less than the first amount and more than the second, will be deposited. The deposited material 28 will then be spread over the entire area of the deposition control plate 22.

In other examples, the area over which the material 28 is spread may be altered, by, for example, controlling where the material 28 is deposited.

For example, if a deposition control plate 22 comprises four apertures 114, 116, 118, 120 and objects 36 are to be formed in apertures 114 and 116 only, material 28 may not be deposited along the full extent of the deposition control plate 22 orthogonal to A. Material may only be deposited in an area level with apertures 114 and 116. The material 28 is then spread along the full extent of the deposition control plate 22 in the direction of A.

FIGS. 2A, 2B and 2C, 3A, 3B and 3C, 4, 5, 6, 8 and 9 illustrate an apparatus 21 for making an object 36. The apparatus 21 comprises a platform 38 configured to move in the vertical direction. The apparatus 21 further comprises means for supporting a deposition control plate 22 over the platform 38. One or more apertures 24 in the deposition control plate 22 restrict deposition of material 28 to one or more deposition areas over the platform 38.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of making an object comprising repeatedly:
   selectively depositing a material by controlling one or more deposition areas using a deposition control plate including one or more apertures, the one or more deposition areas being defined within a volume of an apparatus for making the object, the deposition control plate being supported by pins within the volume of the apparatus, the pins being retractable from the volume;
   partially melting at least some of the selectively deposited material; and
   selectively melting the selectively deposited material such that: (i) a first part of the selectively deposited material is selectively melted to form a layer of the object, and (ii) a second part of the selectively deposited material is partially melted to form a layer of a retainer circumscribing the layer of the object.

2. The method of claim 1, further comprising:
   providing a base prior to making the object; and
   providing a cap after making the object;
   wherein the base, cap and layers of the retainer form an environmentally controlled container.

3. The method of claim 1, wherein the one or more apertures of the deposition control plate define a deposition volume for selective deposition, the method comprising:
   controlling deposition of the material in dependence on the one or more apertures.

4. The method of claim 3, further comprising:
   controlling an amount of material deposited in dependence on the deposition volume; and/or
   controlling the one or more areas of the selective deposition in dependence on a location of the one or more apertures.

5. The method of claim 1, wherein:
   a first aperture of the deposition control plate is defined by a first perimeter;
   the method further comprises:
      selectively melting at least an interior part of the selectively deposited material to form a layer of the object; and
      selectively melting a part of the selectively deposited material adjacent to the first aperture;
   the selectively melted part adjacent to the first aperture defines a new deposition control plate including a second aperture defined by a second perimeter; and
   the second perimeter does not extend beyond the first perimeter.

6. The method of claim 1, further comprising forming the deposition control plate by:
   depositing material; and
   selectively melting the deposited material.

7. The method according to claim 1, further comprising producing an object as a direct product by releasing the object from the selectively deposited material that has not been selectively melted.

8. An apparatus for making an object comprising:
   means for supporting a deposition control plate, one or more apertures in the deposition control plate restrict restricting deposition of material to one or more deposition areas, the one or more deposition areas being defined within a volume of the apparatus, the means for supporting the deposition control plate including pins within the volume, the pins being retractable from the volume; and an energy source configured to:
  partially melt at least some of the deposited material; and
  selectively melt material deposited within the one or more deposition areas.

9. The apparatus of claim 8, wherein the means for supporting the deposition control plate are configured so that the deposition control plate is supported such that a top of the deposition control plate is level with a plane over which material is deposited.

10. The apparatus of claim 8, wherein:
the means for supporting the deposition control plate includes at least one recess external to the volume.

11. The apparatus of claim 10, wherein:
the at least one recess is configured such that when material is deposited in an absence of the deposition control plate, material is deposited in the at least one recess; and
the at least one recess and the energy source are configured such that the material deposited in the recess are melted to form at least one support for the deposition control plate.

12. An apparatus for making an object comprising:
a deposition control plate including one or more apertures for restricting deposition of a material to one or more deposition areas;
means for supporting the deposition control plate, the one or more apertures in the deposition control plate restricting deposition of material to the one or more deposition areas, the one or more deposition areas being defined within a volume of the apparatus, the means for supporting the deposition control plate including pins within the volume, the pins being retractable from the volume; and
an energy source configured to:
  partially melt at least some of the deposited material; and
  selectively melt material deposited within the one or more deposition areas.

13. An apparatus for making an object comprising:
a plurality of supports configured to support a deposition control plate, the deposition control plate including one or more apertures configured to restrict deposition to one or more deposition areas, the one or more deposition areas being defined within a volume of the apparatus, the plurality of supports including pins within the volume, the pins being retractable from the volume; and
an energy source configured to selectively melt material deposited within the one or more deposition areas such that: (i) a first part of the deposited material is selectively melted to form a layer of the object, and (ii) a second part of the deposited material is partially melted to form a layer of a retainer circumscribing the layer of the object.

* * * * *